United States Patent
Zeira (10) Patent No.: US 7,630,688 B2
(45) Date of Patent: Dec. 8, 2009

(54) MITIGATION OF WIRELESS TRANSMIT/RECEIVE UNIT (WTRU) TO WTRU INTERFERENCE USING MULTIPLE ANTENNAS OR BEAMS

(75) Inventor: Eldad Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 587 days.

(21) Appl. No.: 11/025,252

(22) Filed: Dec. 29, 2004

(65) Prior Publication Data

US 2005/0221861 A1   Oct. 6, 2005

Related U.S. Application Data

(60) Provisional application No. 60/557,967, filed on Mar. 31, 2004.

(51) Int. Cl.
*H04B 1/00* (2006.01)

(52) U.S. Cl. .................. 455/63.1; 455/278.1; 370/328; 370/332

(58) Field of Classification Search .............. 455/562.1, 455/63.1, 114.1, 278.1, 296, 67.13, 135, 455/161.3, 277.2, 13.3, 25, 63.4, 82, 575.7; 370/310, 328, 330, 332
See application file for complete search history.

(56) References Cited

U.S. PATENT DOCUMENTS

| | | | |
|---|---|---|---|
| 5,574,983 A * | 11/1996 | Douzono et al. .............. | 455/69 |
| 5,631,898 A | 5/1997 | Dent | |
| 6,229,486 B1 | 5/2001 | Krile | |
| 6,314,305 B1 | 11/2001 | Solondz et al. | |
| 6,400,315 B1 * | 6/2002 | Adler et al. ................. | 342/359 |
| 6,470,194 B1 * | 10/2002 | Miya et al. ............... | 455/562.1 |
| 6,621,454 B1 | 9/2003 | Reudink et al. | |
| 6,741,550 B1 * | 5/2004 | Shin ........................... | 370/209 |
| 7,058,002 B1 * | 6/2006 | Kumagai et al. ........... | 370/203 |
| 7,103,384 B2 | 9/2006 | Chun | |
| 7,412,212 B2 * | 8/2008 | Hottinen ..................... | 455/101 |

(Continued)

FOREIGN PATENT DOCUMENTS

EP  1 363 357  11/2003

(Continued)

OTHER PUBLICATIONS

Viering et al., "Improving uplink adaptive antenna algorithms for WCDMA by covariance matrix compensation,".

(Continued)

*Primary Examiner*—Duc Nguyen
*Assistant Examiner*—Dominic E Rego
(74) *Attorney, Agent, or Firm*—Volpe and Koenig, P.C.

(57) ABSTRACT

Multiple antenna elements of a WTRU are used to form an adaptive antenna beam pattern for receiving signals in the downlink direction. The WTRU utilizes the formed antenna beam to form a transmission antenna beam for transmitting signals in the uplink direction. In an alternate embodiment, the multiple antenna elements are used to form a plurality of fixed, predetermined antenna beams. The WTRU then selects and switches to the one of the predetermined beams that yields the best downlink reception signals. The WTRU utilizes the selected beam pattern to transmit signals in the uplink direction. In an alternate embodiment, the WTRU receives spectral arrangement information and utilizing this information to avoid transmitting in the direction of spectrally adjacent WTRUs.

14 Claims, 4 Drawing Sheets

U.S. PATENT DOCUMENTS

| | | | |
|---|---|---|---|
| 7,457,590 B2 * | 11/2008 | Frank | 455/69 |
| 2001/0009861 A1 * | 7/2001 | Martin et al. | 455/562 |
| 2001/0055297 A1 | 12/2001 | Benveniste | |
| 2002/0146044 A1 * | 10/2002 | Esmailzadeh et al. | 370/542 |
| 2002/0158800 A1 | 10/2002 | Aoyama | |
| 2003/0123530 A1 * | 7/2003 | Maeda et al. | 375/148 |
| 2003/0176166 A1 * | 9/2003 | Doi et al. | 455/24 |
| 2004/0008760 A1 * | 1/2004 | Dogan | 375/219 |
| 2004/0028003 A1 | 2/2004 | Diener et al. | |
| 2004/0106436 A1 | 6/2004 | Ochi et al. | |
| 2008/0102797 A1 | 5/2008 | Coleman et al. | |

FOREIGN PATENT DOCUMENTS

| | | |
|---|---|---|
| GB | 2 349 045 | 10/2000 |
| GB | 2 393 077 | 3/2004 |
| JP | 2002-325062 | 11/2002 |
| JP | 2003-258709 | 9/2003 |
| JP | 2004-356924 | 12/2004 |
| WO | 03/075396 | 9/2003 |
| WO | 03/096710 | 11/2003 |
| WO | 2004/023665 | 3/2004 |

OTHER PUBLICATIONS

Viering et al., "Improving uplink adaptive antenna algorithms for WCDMA by covariance matrix compensation".

* cited by examiner

MITIGATION OF WIRELESS TRANSMIT/RECEIVE UNIT (WTRU) TO WTRU INTERFERENCE USING MULTIPLE ANTENNAS OR BEAMS

CROSS REFERENCE TO RELATED APPLICATION(S)

This application claims the benefit of U.S. Provisional Application 60/557,967; filed Mar. 31, 2004, which is incorporated by reference as if fully set forth.

FIELD OF INVENTION

The present invention relates to a wireless communication system. More particularly, the present invention relates to mitigating wireless transmit/receive unit (WTRU) to WTRU interference in a wireless communication system.

BACKGROUND

Conventional wireless transmit/receive units (WTRUs) typically comprise a single omni-directional antenna that transmits and receives equally in all directions. Utilizing such antennas, however, significantly wastes WTRU resources as most of a WTRU's energy is used to transmit and receive in directions other than that which is intended. More significantly, this wasted energy is experienced as noise-like interference by nearby WTRUs. Such interference is especially momentous in cases where the uplink (UL) frequency of one WTRU is either the same or near the downlink (DL) frequency of another WTRU. This concept is illustrated in FIG. 1.

Figure 1:
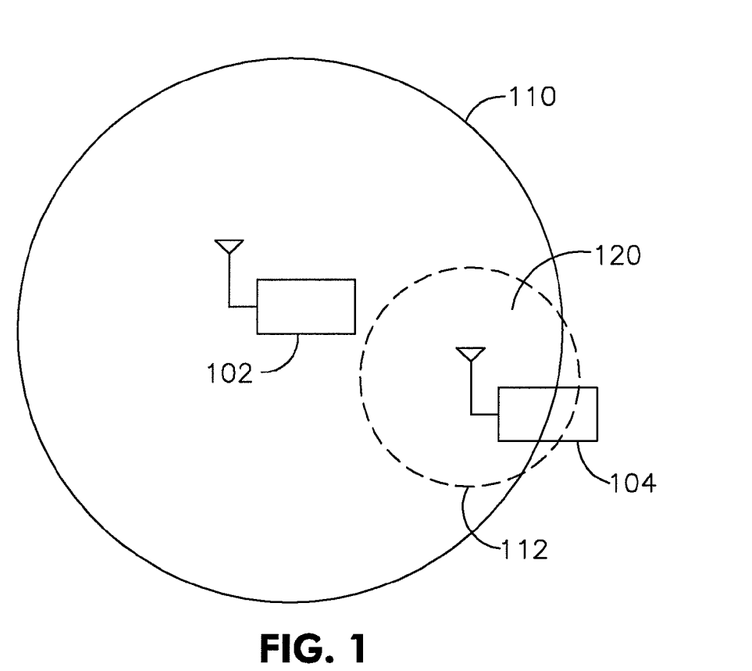
FIG. 1 shows a wireless transmit/receive unit (WTRU) transmitting omni-directionally and interfering with a nearby WTRU.

FIG. 1 shows a WTRU 102 transmitting omni-directionally. WTRU 104 has an omni-directional receiving beam 112. As the two WTRUs are physically and spectrally close, WTRU 104 experiences significant levels of interference and performance degradation. The interference radius 110 of the interfering WTRU 102 is determined by its own transmission level, the sensitivity of the receiving WTRU 104, the antenna pattern of WTRU 104, and the level of WTRU 104's desired signal. The performance degradation experienced by WTRU 104 reduces the signal-to-interference ratio (SIR) and therefore the signal-to-interference-plus-noise ratio of signals it receives. If significant enough, the interference 120 caused by WTRU 102 can lead to reduced data rates, loss of connection, and/or poor signal quality. This phenomenon is known as WTRU to WTRU (mobile station (MS)-MS) interference.

As described above, WTRUs that utilize omni-directional antennas lack the technology to preferentially control antenna gain so as to minimize the transmitting of unwanted signals toward nearby WTRUs. Similarly, utilizing such antennas prevent WTRUs from rejecting interfering signals emitted from unwanted sources including other nearby WTRUs. Typically, only base stations have been equipped with components and technology to maximize antenna gain in a desired direction while simultaneously limiting the reception of signals in the directions of interfering devices.

Accordingly, it is desirable to have a WTRU than can maximize antenna gain in a desired direction and/or selectively receive signals from a desired direction so as to minimize MS-MS interference.

SUMMARY

The present invention relates to a method and apparatus for mitigating wireless transmit/receive unit (WTRU) to WTRU interference in a wireless communication system. Multiple antenna elements of a WTRU are used to control the reception gain of the WTRU's antenna. Similar control is applied to a transmitting antenna to reduce emissions towards nearby WTRUs.

In an alternate embodiment, the multiple antenna elements are used to form a plurality of fixed, predetermined antenna beams. The WTRU then selects and switches to the one of the predetermined beams that reduces interference from nearby WTRUs. The same beam pattern is used when transmitting to reducing interference caused to nearby WTRUs.

In an alternate embodiment, a WTRU comprises an antenna array and receives spectral arrangement information. Utilizing this spectral information, the WTRU transmits so as to avoid spectrally adjacent WTRUs. Alternatively, the WTRU scans transmission frequencies in search of high energy sources. The WTRU then determines the transmission directions of any high energy (and therefore close) sources and transmits on its antennas so as to avoid transmitting in the direction of the high energy sources.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "wireless transmit/receive unit" (WTRU) includes but is not limited to a user equipment, mobile station, fixed or mobile subscriber unit, pager, or any other type of device capable of operating in a wireless environment. When referred to hereafter, the terminology "base station" includes but is not limited to a node-B, site controller, access point or any other type of interfacing device in a wireless environment.

Although the following embodiments are described in terms of WTRU to WTRU interference, the technology disclosed herein is also applicable to base station to base station interference scenarios. For example, access point (AP) to AP interference levels, wherein the downlink of a first AP interferes with the uplink of a second AP, can be mitigated utilizing the technology disclosed herein.

In addition, although beams hereinafter are described primarily in two dimensions, some of the beams may be elevated, having different azimuths.

In a first preferred embodiment, adaptive antennas, i.e., an adaptive antenna array, are employed in a WTRU receiver to protect against interference from a nearby WTRU. Unlike single antennas utilized by conventional WTRUs, (which approximately have omni-directional antenna patterns (see FIG. 1)), adaptive antenna arrays are capable of generating antenna patterns that are dynamically adjusted in real time to adapt to current radio conditions. Employed in a WTRU, an antenna array continually monitors its radio frequency (RF) environment and in particular, monitors signals received from a servicing base station and any received interference.

A signal processing unit, also in the present WTRU, is utilized to calculate antenna weights by which signals received in each antenna element are multiplied. These antenna weights serve to form the WTRU's beam pattern. Since the antenna array is constantly monitoring for radio changes, the signal processing unit is continuously recalculating the antenna weights so as to optimize the WTRU's antenna pattern. The antenna weights are calculated to either: 1) maximize signal-to-noise ratio (SNR) or signal to noise plus interference ratio (SNIR); or 2) minimize received interference signals; or 3) minimize received interference while maintaining received signal levels at an acceptable constant. Hereinafter, these three optimization alternatives shall be referred to collectively as "the three optimization alternatives". One embodiment of a receiver portion of the above described WTRU is shown in FIG. 2.

Figure 2:
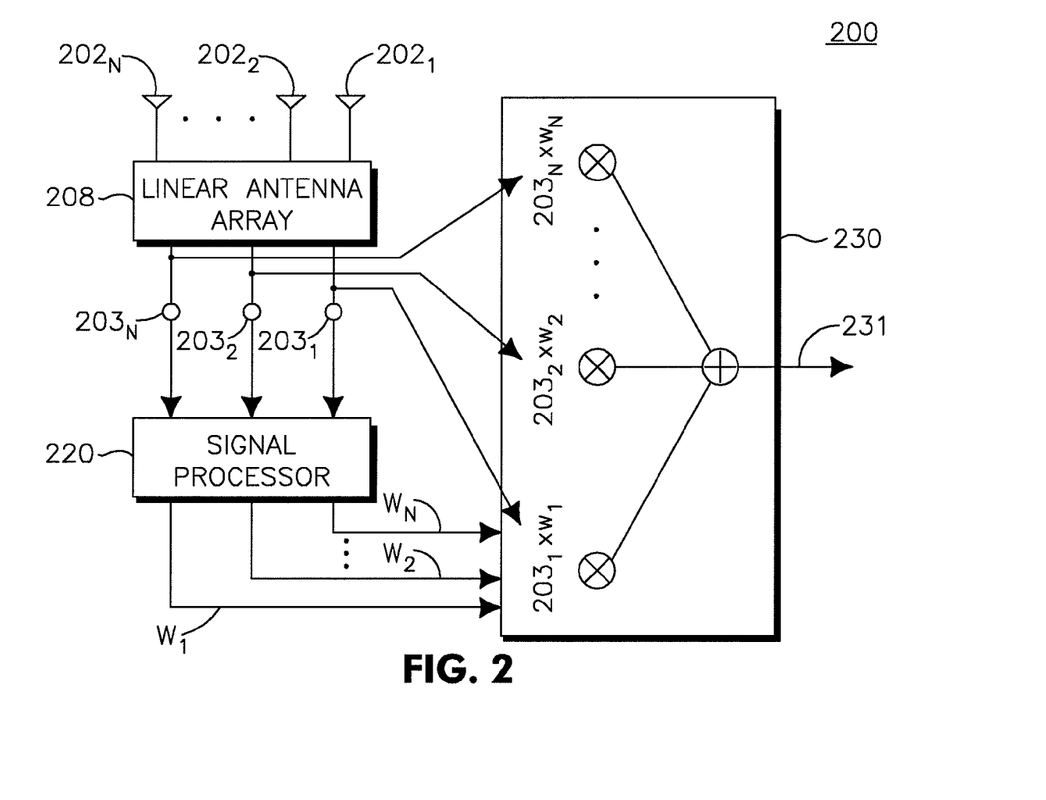
FIG. 2 illustrates a receiver portion of a WTRU comprising an adaptive antenna array.

Antenna elements $202_1$, $202_2$, and $202_N$ in FIG. 2 are arranged in a linear configuration to form antenna array 208. It should be understood that linear, circular, planar, and any other 2 or 3 dimensional antenna arrangements can be utilized to form an antenna array. Signals received in the antenna array 208 depend on the location of the antennas $202_1$, $202_2$, and $202_N$ and on adaptive complex weights $w_1$, $w_2$, and $w_N$ applied to the received signals. Alternatively, adaptive delays and gain combinations could be used in lieu of these complex weights. Any method to adjust these weights $w_1$, $w_2$, and $w_N$ may be utilized to achieve the three optimization alternatives discussed above. For example, properly quantized sets of weights can be tried one after the other until a suitable set is found. Signal processor 220 sends the determined antenna weights, $w_1$, $w_2$, and $w_N$, to a signal weighting unit 230. In the signal weighting unit 230, the originally received signals $203_1$, $203_2$, and $203_N$ are combined with calculated weights $w_1$, $w_2$, and $w_N$, respectively, and then combined to form a single weighted signal 231.

Figure 3:
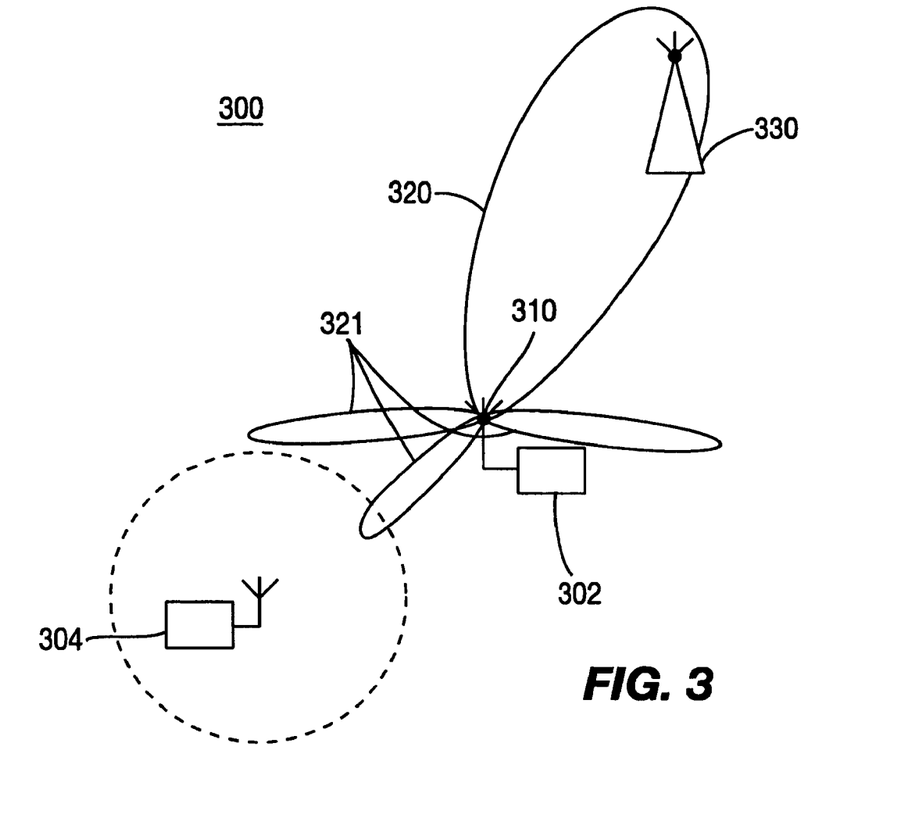
FIG. 3 illustrates a WTRU utilizing an adaptive antenna array.

Utilizing adaptive antennas in this manner permits WTRUs to form directional beam patterns so as to achieve any of the three optimization alternatives discussed above. In creating such directional beam patterns, adaptive antennas also create nulls. Nulls are merely directions of low antenna gain. FIG. 3 illustrates this concept. A WTRU 302 is shown having an antenna array 310 that directs a beam pattern 320 toward a base station 330. Antenna array 310 also directs nulls 321, approximately toward WTRU 304, a nearby source of WTRU to WTRU (MS-MS) interference. In this example, null beams 321 have the effect of "nulling" out or minimizing interference caused by signals transmitted in the uplink (UL) direction from WTRU 304.

In a second preferred embodiment, an adaptive antenna array is utilized to select antenna weights so as to achieve one of the three optimization alternatives discussed above. The WTRU then utilizes antenna weights derived from the selected weights in order to transmit to a base station. It is important to note that the derived transmission weights are chosen such that the essential location and shape of beam created for the receiver is kept. As an example, the derived transmission antenna weights could be the same as the antenna weights selected for receiving signals.

Figure 4:
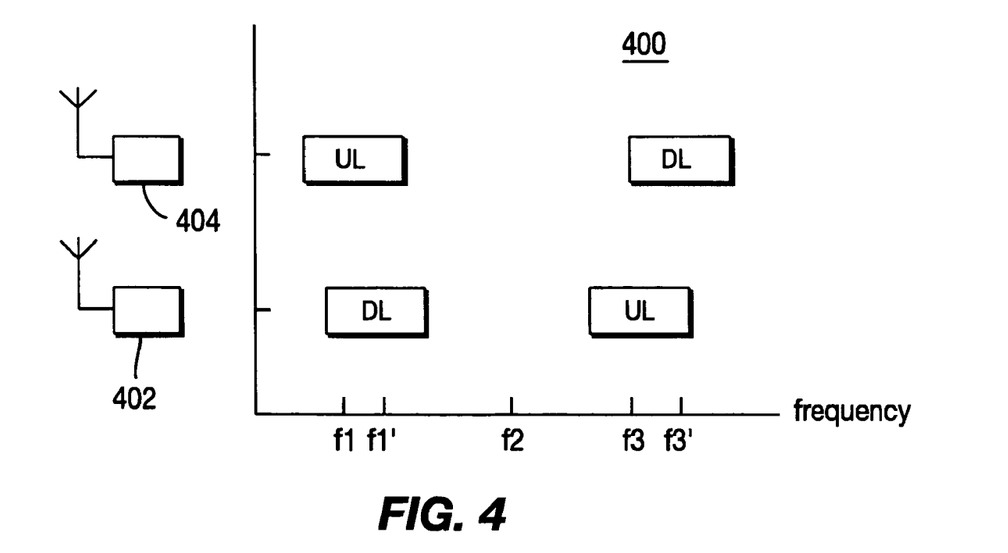
FIG. 4 illustrates two WTRUs in a reciprocal interference state with each other.

Transmitting with antenna weights derived as described above is particularly useful when a transmitting WTRU is in a reciprocal interference state with a nearby WTRU. WTRUs are described as being in a reciprocal interference state when, for example, the UL frequency of a first WTRU is near or the same as the DL frequency of a second WTRU and the DL frequency of the first WTRU is near or the same as the UL frequency of the second WTRU. To illustrate, FIG. 4 shows two WTRUs, 402 and 404, in a reciprocal interference state with each other. The UL frequency f1 of WTRU 404 is very near the DL frequency f1' of WTRU 402. Similarly, the UL frequency f3 of WTRU 402 is very near the DL frequency f3' of WTRU 404. Hence, WTRUs 402 and 404 are in a reciprocal interference state with each other wherein both WTRUs experience MS-MS interference when the other is transmitting.

In communication systems that utilize time division duplex (TDD), WTRUs both transmit and receive signals on the same frequency. In the absence of alignment, such WTRUs could experience reciprocal interference. For example, if two TDD WTRUs are assigned different time slots or frequencies and their respective frequencies are close or their timings are not properly aligned or both, these WTRUs may experience reciprocal interference.

In the same manner described above in the first preferred embodiment, WTRUs in accordance with the present embodiment utilize antenna weights to optimize the signal quality of desired signals according to one of the three optimization alternatives defined above. In the present embodiment, however, WTRUs derive antenna weights from the selected reception antenna weights in order to transmit in the UL direction. By utilizing such derived antenna weights to form directional transmission beams, energy directed towards neighboring WTRUs will be reduced serving to protect nearby WTRUs from experiencing MS-MS interference.

Figure 5:
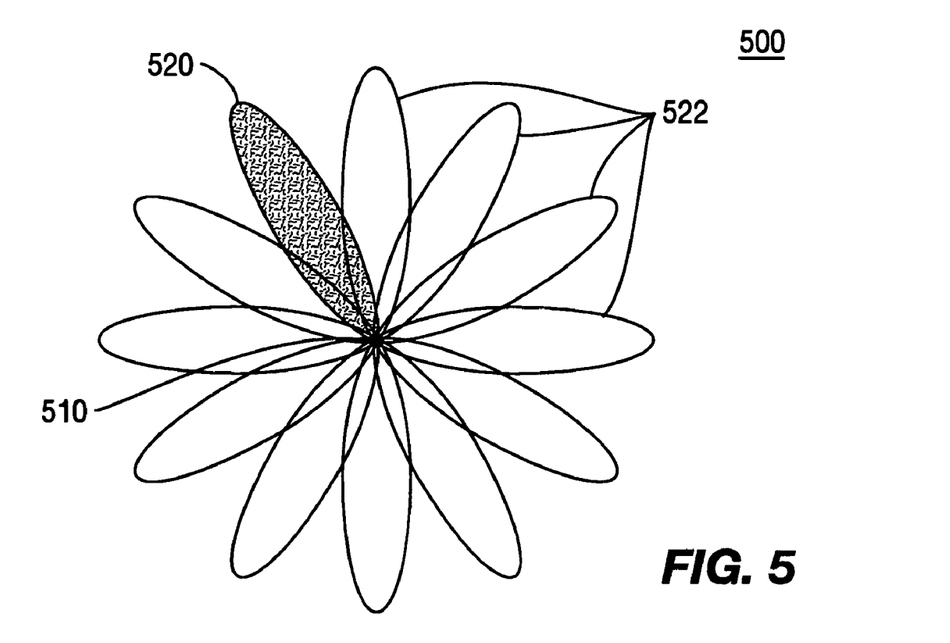
FIG. 5 illustrates a switched-beam antenna array with its formed predetermined beams.

In a third preferred embodiment, a switched-beam/switched antenna array (SBSA) is employed in a WTRU receiver to protect against interference from nearby WTRU (s). A SBSA either forms multiple predetermined beams, a subset of which is selected to be used at any given time, or forms a set of beams out of a larger set of predetermined beam positions. It should be noted that one of these formed beam patterns may be an omni-directional beam pattern. An example of these predetermined beam patterns is illustrated in FIG. 5. Switched-beam/switched antenna array 510 is shown with its twelve predetermined antenna beams 520 and 522. Beam 520 is highlighted to illustrate that it is the beam that provides the highest signal quality, perhaps pointing in the direction of a base station (not shown).

It should be understood that FIG. 5 is solely intended to serve as an example of the SBSA concept. SBSA systems in accordance with the present embodiment may have as few as two predetermined antenna beams, possibly including one that has an omni-directional response. The fewer the number of antenna beams formed by a SBSA, the wider each such beam will need to be. The beam width and the number of beams are often determined by device type and size considerations.

In accordance with the present embodiment, signals are measured in each of a WTRU's predetermined beams. One of these beams is then selected so as to: 1) maximize the signal to noise plus interference ratio (SNIR) of the received signal; or 2) minimize the energy received from nearby WTRUs; or 3) minimize energy received from nearby WTRUs while maintaining a sufficient desired signal level. A switching function then switches to the selected one of these fixed beam patterns to receive desired signals in the downlink direction.

Figure 6:
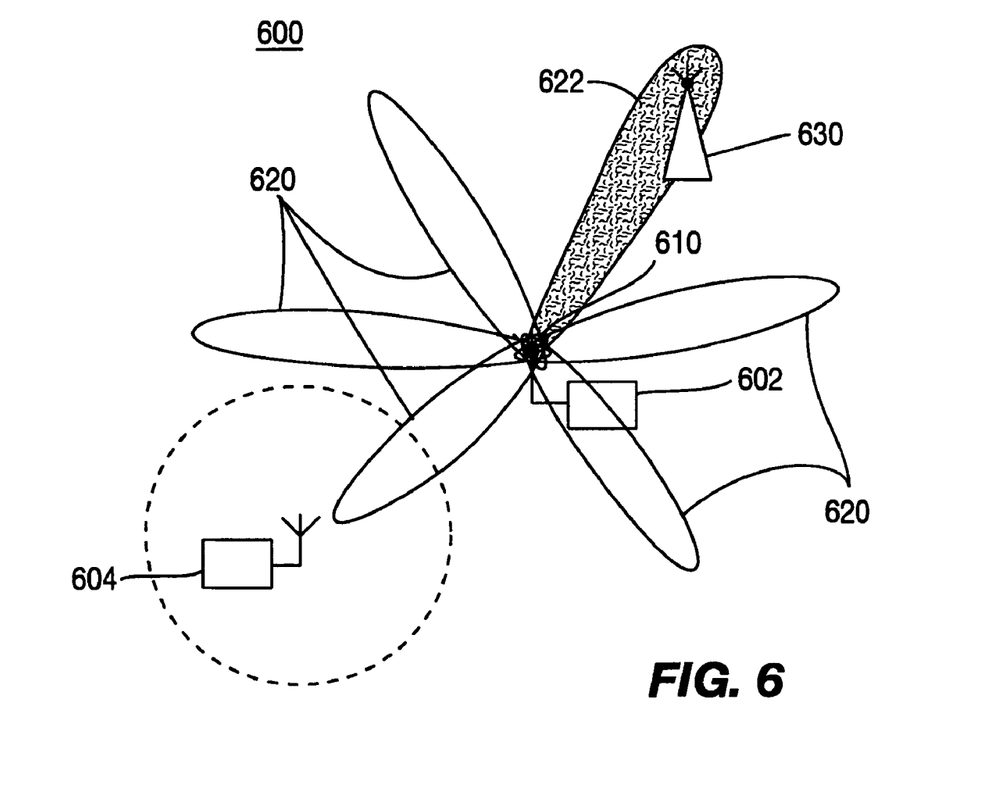
FIG. 6 illustrates a WTRU utilizing a switched-beams antenna array.

In some cases, the selected beam may be an omni-directional beam. The continued reduction of interference energy received from nearby WTRUs is maintained by frequently switching between predetermined beam patterns in response to the WTRU's signal environment. This concept is illustrated in FIG. 6.

Antenna array 610 of WTRU 602 has formed multiple predetermined beams 620 and 622. Beam 622 is highlighted to illustrate that it is active and directed towards base station 630. Accordingly, it has reduced gain toward nearby WTRU 604.

Utilizing switched-beam antennas in a manner described above permits WTRUs to select from a plurality of predetermined antenna beams. In selecting one of these beams, interference received from nearby WTRUs is reduced as shown in FIG. 6. An added advantage to such an implementation is that it minimizes both in-band and out-of-band interference at the same time.

In a fourth preferred embodiment, a switched-beam antenna array is utilized in a WTRU to minimize MS-MS interference experienced by a nearby WTRU, particularly if the WTRUs are in a reciprocal interference state. As previously described, WTRUs are in reciprocal interference when, for example, the DL frequency of a first WTRU is near the UL frequency of a second WTRU while the DL frequency of the second WTRU is near the UL frequency of the first WTRU (see FIG. 4). In the absence of proper alignment, WTRUs in a TDD communication system could also experience reciprocal interference.

In the same manner described above in the third preferred embodiment, a WTRU selectively switches between a plurality of predetermined, fixed antenna beams so as to maximize SNIR, minimize energy received from nearby WTRUs, or minimize energy received from nearby WTRUs while maintaining a sufficient desired signal level. In the present embodiment, however, the WTRU utilizes the same selected antenna beam to transmit in the UL direction. Since the selected beam minimizes interference energy from unwanted sources, transmitting on this same beam will minimize the transmission of unwanted energy toward nearby sources. Accordingly, by transmitting in the selected beam direction, interference toward nearby WTRUs is minimized.

In a fifth preferred embodiment, a smart antenna array is utilized in a WTRU to minimize MS-MS interference experienced by nearby WTRU(s), particularly when the WTRUs are in an asymmetric interference state. Hereinafter, the phrase "smart antenna" is used to describe either an adaptive antenna array or a switched-beam/switched antenna array. For the purposes of the present embodiment, WTRUs are in an asymmetric interference state when a first WTRU interferes with the DL reception of a spectrally adjacent second WTRU. However, the UL transmissions of the second WTRU do not interfere with the DL reception of the first WTRU. This concept is illustrated in FIG. 7.

A communication system 700 is shown wherein TDD WTRU 702 has an UL frequency of f1. WTRU 704, an FDD device, is shown having a DL reception frequency spectrally adjacent to that of WTRU 702. As a result, TDD device 702 interferes with the DL reception of spectrally adjacent FDD device 704. This interference, however, is asymmetric because the UL transmission frequency f3 of FDD device 704 is spectrally distant from the DL frequency f1 of TDD device 702. It should be noted that since WTRU 702 is a TDD device, its UL and DL frequency are the same.

Figure 7:
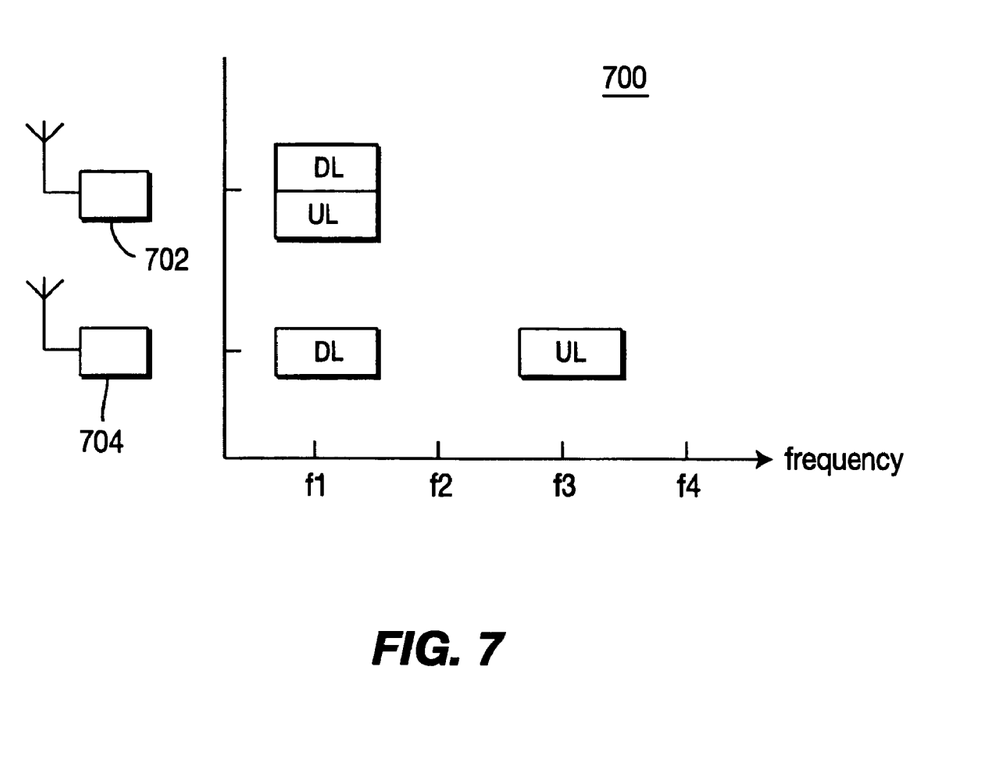
FIG. 7 illustrates two WTRUs in an asymmetric interference state with each other.

As illustrated in FIG. 7, WTRUs such as TDD device 702 can asymmetrically interfere with nearby WTRUs without being aware that such interference is occurring. This lack of knowledge is caused because the reception frequency of the interfering WTRU is spectrally distant from the UL frequency of the victim WTRU. The present embodiment proposes to minimize such asymmetric interference by providing additional information to interfering WTRUs. An asymmetrically interfering WTRU, (such as TDD WTRU 702 from FIG. 7), is notified of the spectral arrangement in its signal environment. In particular, it is notified of the UL frequencies of WTRUs whose DL frequencies are adjacent to its UL frequency. This information alerts the interfering WTRU as to the existence of other WTRUs to whom it may possibly cause interference. The interfering WTRU then scans those UL frequencies to determine the actual locations of these WTRUs. The interfering WTRU may determine the locations of these WTRUs by, for example, searching for high energy signals. A high enough energy level in an UL direction implies that a WTRU is probably nearby and likely to be interfered with. The interfering WTRU then accordingly adjust its UL transmission direction utilizing, for example, any of the embodiments described herein, so as to minimize interfering with nearby WTRU(s).

Alternatively, rather than notifying an interfering WTRU as to a spectral arrangement in its signal environment and thus, limiting the WTRUs search, the WTRU can scan all possible frequencies. Although the components of the various embodiments are discussed in terms of separate components, it should be understood that they may be on a signal integrated circuit (IC), such as an application specific integrated circuit (ASIC), multiple ICs, discrete components or a combination of discrete components and IC(s).

Similarly, although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for mitigating wireless transmit/receive unit (WTRU) to WTRU interference in wireless communications, the method comprising:

monitoring received signals at a WTRU including a downlink (DL) communication signal and an interfering uplink (UL) communication signal from another WTRU;

determining a signal quality of the DL communication signal;

calculating reception antenna weights based on the signal quality;

forming a directed antenna beam for receiving signals based on the reception antenna weights such that a reception beam is directed toward a source of the received DL communication signal and a null beam is directed toward a source of the interfering UL communication signal;

deriving transmission antenna weights from the reception antenna weights; and forming a directed transmission beam for transmitting UL signals based on the derived transmission antenna weights.

2. The method of claim 1 wherein the transmission antenna weights are derived to be equal to the reception antenna weights.

3. The method of claim 1 further comprising dynamically adapting the formed antenna beams to current radio conditions.

4. The method of claim 1 wherein the reception antenna weights are calculated to increase signal-to-noise ratio (SNR) or signal-to-noise plus interference ratio (SNIR).

5. The method of claim 1 wherein the reception antenna weights are calculated to reduce received interference.

6. The method of claim 1 wherein the reception antenna weights are calculated to reduce received interference while maintaining a constant received signal level of the DL communications signal.

7. The method of claim 1 further comprising directing multiple nulls in directions other than that of the source of the DL communications signal.

8. A wireless transmit/receive unit (WTRU) comprising:
an antenna array configured to receive signals including a downlink (DL) communication signal and an interfering uplink (UL) communication signal from another WTRU;
a signal processing unit configured to determine a signal quality of the DL communication signal and calculate reception antenna weights based on the signal quality;
the antenna array operatively associated with a signal weighting unit to form a directed antenna beam for receiving downlink (DL) signals based on the reception antenna weights such that a reception beam is directed toward a source of the received DL communication signal and a null beam is directed toward a source of the interfering UL communication signal;
the signal processing unit configured to derive transmission antenna weights from the reception antenna weights; and
the antenna array operatively associated with the signal weighting unit to form a directed transmission beam for transmitting uplink (UL) signals based on the transmission antenna weights.

9. The WTRU of claim 8 wherein the signal processing unit is configured to derive the transmission antenna weights to be equal to the reception antenna weights.

10. The WTRU of claim 8 wherein the signal processing unit, the antenna array, and the signal weighting unit are configured to dynamically adapt the formed antenna beams to current radio conditions.

11. The WTRU of claim 8 wherein the signal processing unit is configured to calculate the reception antenna weights to increase signal-to-noise ratio (SNR) or signal-to-noise plus interference ratio (SNIR).

12. The WTRU of claim 8 wherein the signal processing unit is configured to calculate the reception antenna weights to reduce received interference.

13. The WTRU of claim 8 wherein the signal processing unit is configured to calculate the reception antenna weights to reduce received interference while maintaining a constant received signal level of the DL communications signal.

14. The WTRU of claim 8 wherein the antenna array is operatively associated with the signal weighting unit to form the directed antenna beam such that multiple nulls are directed in directions other than towards the source of the DL communications signal.

* * * * *

UNITED STATES PATENT AND TRADEMARK OFFICE
CERTIFICATE OF CORRECTION

PATENT NO. : 7,630,688 B2 Page 1 of 1
APPLICATION NO. : 11/025252
DATED : December 8, 2009
INVENTOR(S) : Eldad Zeira It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 998 days.

Signed and Sealed this

Twenty-first Day of December, 2010

David J. Kappos
*Director of the United States Patent and Trademark Office*